April 6, 1965     I. W. PATERSON     3,177,407
HOUSING FOR ELECTRICAL COMPONENTS
Filed Oct. 5, 1962
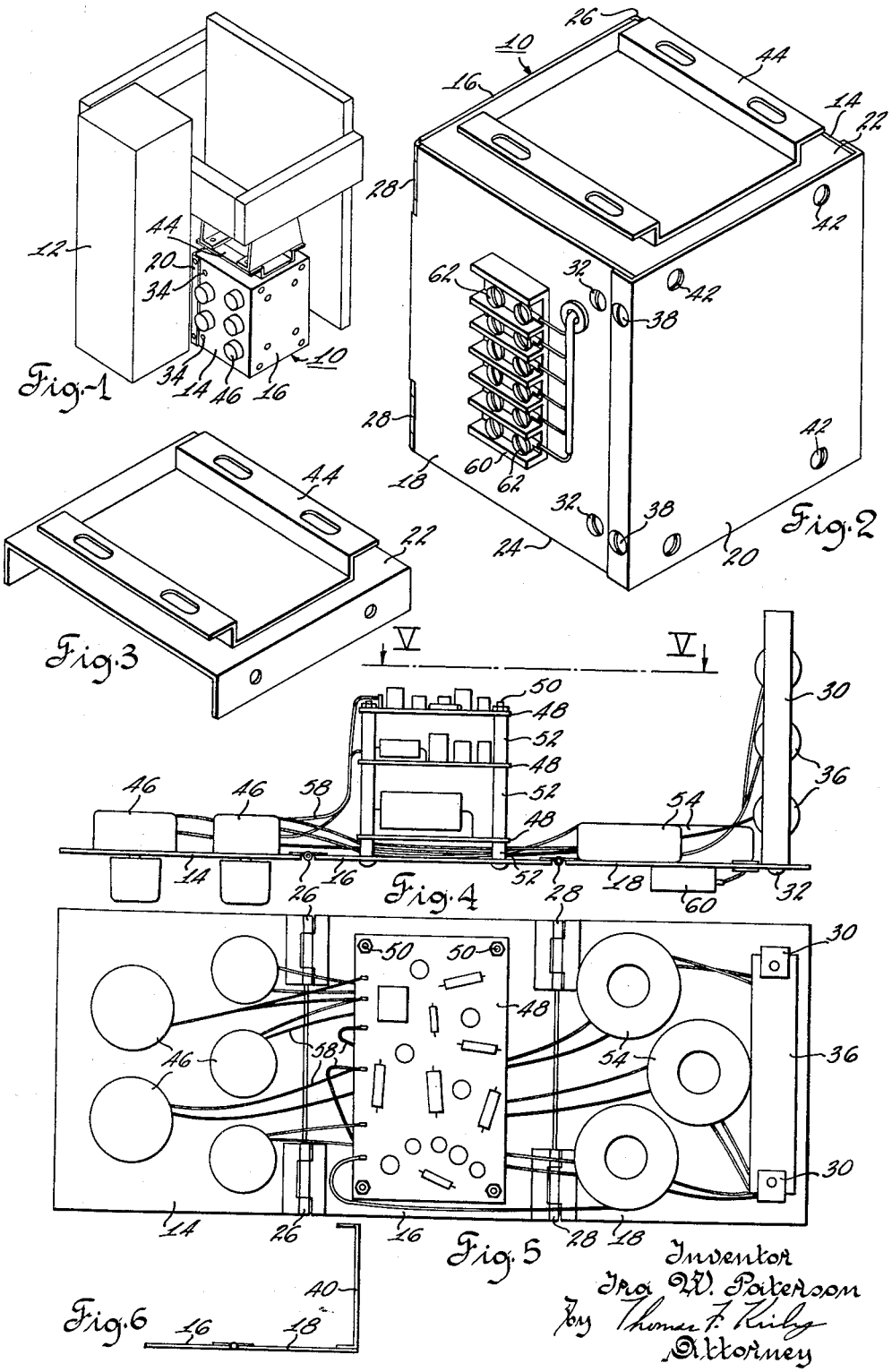

United States Patent Office 3,177,407
Patented Apr. 6, 1965

3,177,407
HOUSING FOR ELECTRICAL COMPONENTS
Ira W. Paterson, Milton, Mass., assignor to Allis-Chalmers Manufacturing Company, Milwaukee, Wis.
Filed Oct. 5, 1962, Ser. No. 228,712
2 Claims. (Cl. 317—101)

This invention relates generally to means for housing electrical components in modular devices.

Many electrical and electronic devices utilize small or miniature components such as transistors, resistors, capacitors, inductance coils, rheostats, potentiometers, switches and the like. Such components are well suited for use in devices wherein space is limited because, for example, the housing or modular device itself must be relatively small or compact. However, difficulties are encountered in handling, mounting, wiring and housing such miniature components in small or compact modular devices.

Accordingly, it is an object of this invention to provide improved means for housing electrical and electronic components in modular devices.

Another object of this invention is to provide an improved modular device having foldable members, such as side walls or panels, which are in an unfolded position during assembly so that the aforesaid components can be readily mounted, assembled, wired and housed therein, and which are then folded and secured to provide a completed modular device.

Another object is to provide an improved modular device which houses electrical and electronic components in compact relationship.

The accompanying drawing illustrates preferred embodiments of the invention, but it is to be understood that the embodiments illustrated are subject to modifications with respect to details thereof without departing from the scope of the appended claims.

FIG. 1 is an isometric view of a modular device incorporating the invention showing how such a device may be employed with other apparatus.

FIG. 2 is an isometric and enlarged view of the rear of the modular device shown in FIG. 1.

FIG. 3 is a view of a member of the type which may be used to close the top and bottom of the device shown in FIGS. 1 and 2.

FIG. 4 is a plan view of the device shown in FIGS. 1 and 2 showing it unfolded as during assembly.

FIG. 5 is a view of the device taken along lines V—V of FIG. 4, and

FIG. 6 is a view similar to FIG. 4 showing an alternative form of construction.

Referring to FIG. 1 the numeral 10 designates a preferred embodiment of a modular device incorporating the invention. It may be assumed, for purposes of illustration and discussion, that device 10 is a static overcurrent trip device which is used to effect the tripping of a circuit breaker 12 on which it is mounted and that it is removable therefrom.

FIGS. 1 through 5 show that device 10 comprises members or panels 14, 16 and 18, a member or plate 20, and top and bottom covers or members 22 and 24, respectively. FIGS. 1, 4 and 5 show that panel 14 is secured to panel 16 by means of hinges 26 and that those panels are relatively movable with respect to each other. FIGS. 1, 2, 4 and 5 show that panel 16 is secured to panel 18 by means of hinges 28 and that those panels are relatively movable with respect to each other.

FIGS. 4 and 5 show that the inner side of panel 18 is provided with means such as brackets 30 which are rigidly secured thereto by suitable means such as screws 32, shown in FIGS. 2 and 4. It is to be understood that when device 10 is assembled as shown in FIGS. 1 and 2, the brackets 30 butt against the inner side of panel 14 and are secured to the latter by suitable means of attachment such as screws 34, shown in FIG. 1. The brackets 30 are shown in FIGS. 4 and 5 as two independent members which afford support for a plurality of electrical components such as resistors 36. If preferred the two brackets 30 could be a unitary member or could take the form of a rigidly attached panel or member 40 as shown in FIG. 6.

As FIG. 2 shows, plate 20 may be employed to cover the brackets 30 and is independently removable from device 10. Plate 20 is understood to be attached to panels 14 and 18 by suitable means such as screws 38.

When device 10 is completely assembled, it may be desirable to completely enclose it by providing the top and bottom covers 22 and 24, respectively, as shown in FIGS. 2 and 3. The cover may be secured to panel 16 and plate 20 by suitable means of attachment such as screws 42. Bottom cover 24 shown in FIGS. 1 and 2 is to be understood as being similar to top cover 22 shown in FIG. 3.

FIGS. 2 and 3 show that cover 22 is provided with means such as a mounting bracket 44 which is rigidly secured thereto as by welding or the like and enables device 10 to be mounted on circuit breaker 12 or other apparatus with which it is employed. If preferred, bottom cover 24 could be provided with a similar mounting means to adapt device 10 for base mounting. It is to be understood, of course, that similar mounting brackets or other means of attachment could be provided at other positions on device 10 if desired.

It is to be understood that device 10 is manufactured by providing panels 14, 16 and 18 of desired shape and having mounting holes for the necessary screws and studs therein. The panels are hinged together and the brackets 30 are attached to provide a subassembly.

As FIGS. 4 and 5 show, during assembly device 10 is unfolded so that the panels 14, 16 and 18, can, if desired, lie in substantially the same plane so as to accommodate the mounting of electrical and electronic components thereon and to enable the necessary electrical connections to be made. In the embodiment shown, it is to be understood that device 10 is mounted on circuit breaker 12 so that panel 14 is in front and is exposed. Accordingly, panel 14 being exposed is shown as having a plurality of rheostats 46 mounted thereon which are accessible for adjustment purposes. The rheostat knobs project from the outer surface of panel 14. If preferred one of the other panels or members of device 10 could serve as the exposed side of the device and could have components accessibly mounted thereon. Panel 16 is shown as affording support for a plurality of printed circuit boards 48 which, as FIGS. 4 and 5 show, are disposed in spaced relationship from each other on mounting studs 50, which are understood to be rigidly secured to panel 16. The printed circuit boards 48 are spaced apart from each other and from the inner side of panel 16 by means such as insulating bushings 52 which are provided on the studs 50. It is to be noted that the printed circuit boards 48 are spaced apart from each other by the bushings 52 at a suitable distance to afford clearance therebetween for accommodating the rheostats 46 on panel 14 when the latter is folded into position.

Panel 18 is shown in FIGS. 4 and 5 as being provided, for example, with a plurality of toroidal type current transformers 54 which are understood to be rigidly attached thereto. It is to be understood that the printed circuit boards 48 are disposed on panel 16 with respect to the edge thereof adjacent to panel 18 so as to afford clearance for the currrent transformers 54 when panel 18 is folded in position. FIG. 2 shows that the exterior side of panel 18 is provided, for example, with a terminal strip 60 having terminals 62 which are understood to be electrically connected to components within device 10 and which are adapted for connection as required to electrical circuitry within circuit breaker 12. If preferred, terminal strip 60 could be mounted on other panels comprising device 10 and more than one terminal strip could be provided.

It will be apparent to those skilled in the art that when the panels of device 10 are unfolded during assembly as shown in FIGS. 4 and 5, the electronic components hereinbefore described can be conveniently attached thereto. Furthermore, conductor wires generally indicated by the numeral 58 for connecting the various components can be conveniently connected as required.

After the components are attached to the panels and have been connected or wired, the panels are folded to enclose the components and the brackets 30 are rigidly secured to panel 14 to rigidify the housing structure. If preferred, the covers 22 and 24 and plate 20 may then be added to completely enclose device 10.

It will be apparent to those skilled in the art that top cover 22, plate 20 and bottom cover 24 which have been shown as three separate members could be fabricated as a unitary member having a generally U-shaped configuration and that this unitary member could be secured to device 10 to the brackets 30 by suitable means of attachment such as screws. If preferred the unitary member could be provided with mounting means similar to mounting bracket 44 hereinbefore described.

Having now particularly described and ascertained the nature of my said invention and the manner in which it is to be performed, I declare that what I claim is:

1. In a housing for electrical components and adapted for mounting on other apparatus, in combination, a plurality of members, each member being hinged to the member adjacent it and foldable to form said housing, a plurailty of mounting studs extending inwardly into said housing from one of said members when said members are folded to form said housing, a circuit board having electrical components thereon mounted on said studs, means for securing said circuit board on said studs, and means for releasably securing said members in folded position so as to form said housing.

2. In a housing for electrical components and adapted for mounting on other apparatus, in combination, a plurality of members, each member being hinged to the member adjacent it and foldable to form said housing, a plurality of mounting studs extending inwardly into said housing from one of said members when said plurality of members are folded to form said housing, a first circuit board having electrical components thereon mounted on said studs, a second circuit board having electrical components thereon mounted on said studs in spaced apart relationship from said first circuit board, means for securing said first and second circuit boards on said studs and means for releasably securing said members in folded position so as to form said housing.

References Cited by the Examiner
UNITED STATES PATENTS

| | | | |
|---|---|---|---|
| 1,282,117 | 10/18 | Ollom et al. | 200—6 |
| 1,451,468 | 4/23 | Olshan | 220—6 |
| 2,630,476 | 3/53 | Zelov | 317—99 |

JOHN F. BURNS, *Primary Examiner.*